United States Patent Office 3,584,044
Patented June 8, 1971

3,584,044
2-SUBSTITUTED TETRACYCLINES
James J. Korst, Old Lyme, Conn., assignor to Pfizer Inc.,
New York, N.Y.
No Drawing. Filed Oct. 13, 1969, Ser. No. 865,986
Int. Cl. C07c 103/19
U.S. Cl. 260—559AT          13 Claims

ABSTRACT OF THE DISCLOSURE

A process for the preparation of 2-decarboxamido-2-iminotetracyclines which comprises contacting the corresponding 2-decarboxamido-2-cyanotetracyclines with a nickel catalyst and an aqueous solution of a lower alkanoic carboxylic acid at a temperature of from about −10 to 75° C.; and the conversion of the 2-decarboxamido-2-iminotetracyclines to a series of novel 2-decarboxamido-2-substituted tetracyclines. The compounds of the present invention possess anti-bacterial activity and are useful in preventing and reducing microbial deterioration in cutting fluids, jet fuels, and diesel oils.

BACKGROUND OF THE INVENTION

This invention relates to novel 2-decarboxamido-2-substituted tetracyclines. In particular, it relates to a process for the preparation of novel 2-decarboxamido-2-iminotetracyclines and novel 2-substituted tetracyclines derived therefrom.

The tetracycline antibiotics comprise a group of biologically active hydronaphthacene derivatives. The skeletal structure and numbering system (Chemical Abstracts) of these compounds is given below.

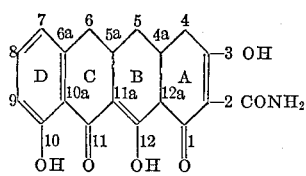

Hitherto, the preparation of tetracyclines containing substituents other than the carboxamido group in the 2-position, have been limited mainly to tetracyclines containing the cyano, N-alkylcarboxamido, and the acetyl group in the 2-position. See for examples U.S. Pats. 3,028,409; 3,146,264 and 3,226,441. The difficulty in preparing new and useful 2-substituted tetracyclines containing various substituents in the 2-position has been partly because of the limited number of 2-substituted tetracycline precursors available, and also because of the difficulty of introducing groups, other than those mentioned above, in the tetracycline 2-position.

The present invention now provides a general method for introducing various substituents in the 2-position of the tetracycline molecule, as well as providing a method for the preparation of new and useful tetracyclines.

SUMMARY OF THE INVENTION

The present invention describes a process for preparing 2-decarboxamido - 2 - iminotetracyclines which comprises contacting a 2-decarboxamido-2-cyanotetracycline with a nickel catalyst and an aqueous solution of an alkanoic carboxylic acid at a temperature of from about −10 to 75° C. until the conversion is substantially complete.

The present invention also comprises a series of 2-substituted tetracyclines selected from the group having the formulae:

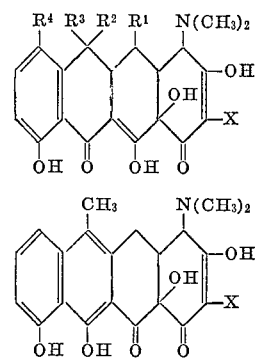

wherein:

$R^1$ is either H or OH;
$R^2$ is either H or OH;
$R^3$ is either H or $CH_3$, provided that $R^3$ is $CH_3$ when $R^1$ is OH;
$R^2$ and $R^3$ taken together are methylene;
$R^4$ is either H, Cl, or Br; and
X is either H, CHO, —CH=NH, —$CH_2NH_2$, or —$CH_2OH$.

The novel compounds of the present invention possess anti-bacterial activity and are useful in preventing and reducing microbial deterioration in cutting fluids, jet fuels, and diesel oils. These compounds are also useful in soaps, shampoos, rinses and the like. They can also be used with topical preparations for the treatment of wounds and burns.

In addition, the novel compounds of the instant invention are useful as chelating agents and form chelate complexes with many cations, and in particular with calcium and magnesium.

DETAILED DESCRIPTION OF THE INVENTION

It has now been surprisingly discovered that tetracycline-2-nitriles can be converted to the corresponding 2-imines by reduction with an activated nickel catalyst and an aqueous alkanoic acid solution. The tetracycline-2-imines are then readily convertible to a series of other tetracycline derivatives. Accordingly, the reduction process of the instant invention now provides a unique and convenient synthetic route to a host of novel tetracycline derivatives. An outline of some of these reactions is illustrated in Chart I.

CHART I

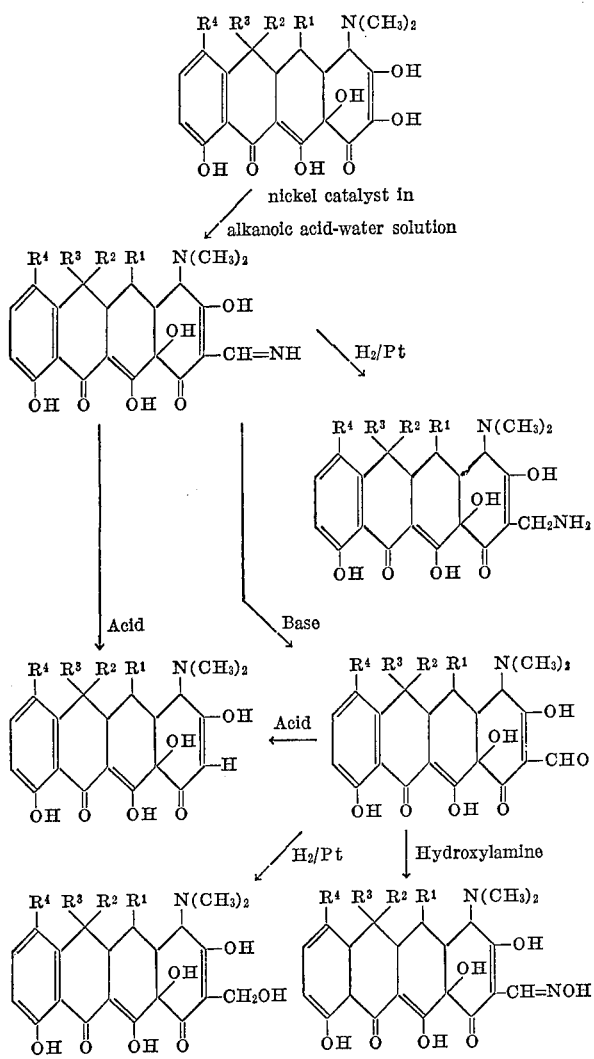

wherein:
R¹ is either H or OH;
R² is either H or OH;
R³ is either H or CH₃, provided that R³ is CH₃ when R¹ is OH;
R² and R³ taken together are methylene;
R⁴ is either H, Cl, or Br.

In the preferred embodiment of the present invention, the tetracycline-2-nitrile is reduced to the corresponding 2-imine in the presence of an activated nickel catalyst and an aqueous solution of a lower alkanoic acid. The reduction is preferably conducted from −10 to 75° C., although this aspect is not critical and the reaction can be carried out at temperature ranges outside these limits. We prefer, however, a range of from 40 to 65° C. Within these limits the reaction is essentially complete in about 15 to 45 minutes.

The ratio of the lower alkanoic acid to water in the aqueous acid solution can be varied over rather wide limits and is not critical to the success of the reaction. The reaction is usually conducted with a ratio of acid to water anywhere from about 1:5 to 5:1 by volume; although we prefer an alkanoic acid:water ratio of about 3:1 by volume. We prefer the lower alkanoic acids of up to 5 carbon atoms, and of these, the acids of choice are formic and acetic acids.

It should be noted that the reduction can also be carried out at room temperature with activated nickel catalyst and either dilute HCl (0.5 N) or a mixture of methanol: 1NHCl (5:2; v./v.). Nevertheless, the use of an aqueous alkanoic acid is preferred as the solvent system.

It must be pointed out that nickel catalysts vary in their effectiveness in reducing the 2-decarboxamidotetracycline-2-nitriles to the corresponding 2-decarboxyamidotetracycline-2-imines. A catalyst of W–2 activity [Org. Syntheses, Coll. vol. 3, 181 (1955)] is preferred. Catalysts of lesser activity or the alloy itself are not as desirable due to the higher reaction temperatures and/or longer reaction times necessary for the disappearance of nitrile, conditions which tend to afford degradation of the tetracyclines.

The reaction is usually carried out by adding under nitrogen the tetracycline-2-nitrile to the stirred aqueous acid solution. The nickel catalyst is then added and the reaction mixture is heated on a steam bath until the reaction is complete. The catalyst is removed by filtration, hydrochloric acid is added, and the imine isolated by conventional methods such as extraction or conversion to an acid addition salt, which can then be filtered from the reaction mixture.

Generally, while about 0.1 to 5.0 g. of nickel catalyst per gram of 2-decarboxamidotetracycline-2-nitrile is usually used, 0.5 to 2.0 g. per gram of nitrile is preferred. It has been surprisingly found that the tetracycline-2-imines resist hydrolysis under the acidic reaction conditions. Although the reason for this is not fully understood, it is believed that the imino group forms a hydrogen bond with an enolized β-keto group, thereby resisting hydrolysis to an aldehyde function.

The 2-decarboxamidotetracycline-2-nitrile starting materials can be prepared by procedures described in: J. Am. Chem. Soc., 75, 5468 (1953); ibid., 79, 2856 (1957); ibid., 77, 1701 (1955); and U.S. Pat. 3,069,467, which comprise the treatment of the corresponding tetracycline with an alkyl or aryl sulfonyl halide in the presence of an organic base. In some cases it is found that such a procedure provides the 10-alkyl or aryl sulfonyl ester of the corresponding 2-decarboxamidotetracycline-2-nitrile. See J. Am. Chem. Soc., 77, 1701 (1955). These esters may be used directly in the reduction described herein, or if desired, they can be converted to the corresponding 10-phenolic tetracycline by treating them with anhydrous hydrofluoric acid.

It is well known that the C–6 hydroxyl group of the tetracyclines is very labile in the presence of acids, and under acidic conditions many tetracyclines containing such a group form the corresponding anhydro-tetracycline (see D. L. J. Clive, Quart. Rev., 22, 435 (1968).

This phenomenon has also been found to occur under the acidic conditions of the instant process. Thus when the reaction is run at higher temperatures tetracycline 2-nitrile gives 2-decarboxamidoanhydrotetracycline-2-imine. Nevertheless, by routine experimentation one can select appropriate conditions to avoid formation of the anhydro product. Generally it is found that lower temperatures and shorter reaction times will provide the C–6-hydroxy-containing imine. Accordingly, under such conditions tetracycline - 2 - nitrile yields 2-decarboxamidotetracycline-2 - imine. 2 - decarboxamidotetracycline-2-imine can also be prepared by reducing 2-decarboxamido-7- chlorotetracycline-2-imine over palladium on charcoal.

Furthermore, as is known, the tetracyclines have a tendency to partial conversion to their 4-epimers in solution at acidic pH. Accordingly, the products of the novel process of the present invention sometimes contain a proportion of 4-epimer. It is usually desired to convert the latter to the corresponding diastereoisomer of normal configuration, i.e., to that form of the antibiotic having the stereochemical configuration of the product produced by fermentation, or, in the case of synthetic tetracycline analogs, to that form which is analogous in stereochemical configuration to fermentation-produced tetracycline, et.

The desired conversion of 4-epimer may be achieved by the procedure described in U.S. Pat. 3,009,956.

According to the procedure in this patent, the tetracycline containing a proportion of 4-epimer is maintained in solution in the form of a metal chelate or salt until isomerization of the epimer to the normal configuration occurs. The tricalcium or trimagnesium tetracycline chelates are suitable forms for this spontaneous conversion, as are the dicalcium, dimagnesium and tristrontium derivatives. They are conveniently formed in a solution of the tetracycline by addition of an appropriate molar proportion of a salt of the selected cation with a reaction-compatible anion, e.g., the chloride. The metal chelate solution is then adjusted to pH 8.5–10 (as measured after dilution of a sample of the organic solution with an equal volume of water) and maintained at a temperature preferably between 50 and 115° C. until the desired transformation is substantially complete. As further disclosed in the above patent, all reaction-inert oxygenated solvents are suitable for this reaction, including liquid polyols and lower alkanols, particularly propylene glycol, butanol, or butanol plus about 5% water. The progress of the isomerization is conveniently followed by periodically withdrawing samples and assaying these by means of paper chromatography. This may be carried out, for example, on Whatman No. 4 paper saturated with pH 4.2 aqueous citrate-phosphate buffer as the stationary phase, employing 20:3 by volume toluene:pyridine saturated with water as the mobile phase. By the use of appropriate controls the location of the 4-epimer spot is accurately ascertained and the progress of its disappearance followed.

The tetracyclines containing substituents at the C–6 position can exist in two epimeric forms, viz, the α and β modifications. This fact is of no consequence to the success of the present invention, and the reduction of the 2-nitrile group to the 2-imino group is not affected by the stereochemistry of the C–6 position.

As shown in Chart I, the 2-iminotetracyclines are readily converted to other novel tetracycline derivatives. Thus, the 2-formyltetracyclines are prepared from the corresponding 2-imines by treating the latter compounds with dilute base for several minutes at room temperature. Acidification of the reaction mixture causes the 2-formyl tetracyclines to separate. The 2-formyl-tetracycline is then isolated and generally purified by conventional methods, for example, by conversion to an acid addition salt which can then be filtered and recrystallized from an appropriate solvent. The 2-formyl tetracyclines can be used to prepare novel 2-hydroxymethyl tetracyclines by catalytic reduction over Adam's catalyst. Removal of the 2-formyl group by refluxing the 2-formyltetracyclines in mineral acid under nitrogen provides the 2-decarboxamidotetracyclines.

The 2-decarboxamidotetracyclines can be prepared from the corresponding 2-imines by also refluxing the latter compounds in mineral acid under nitrogen. Upon cooling the reaction mixture, the 2-decarboxamidotetracycline separates as the acid addition salt and is readily removed from the mixture.

Catalytic reduction of the tetracycline-2-imines over Adam's catalyst or platinum on carbon readily provides the 2-aminomethyl analogs. It is of interest to note that catalytic reduction over palladium on charcoal does not affect the imino group. Thus, as mentioned above, 2-decarboxamido-7-chlorotetracycline-2-imine is conveniently transformed into 2-decarboxamidotetracycline-2-imine by catalytic reduction over palladium on charcoal.

The novel compounds of the present invention exhibit anti-bacterial activity against various pathogenic microorganisms when determined with the standard serial dilution technique. The compounds of the instant invention are useful in preventing and reducing microbial deterioration in various industrial petroleum products such as cutting fluids, jet fuels, and diesel oils. The antimicrobial activity of the instant compounds renders them useful as disinfectant agents in topical preparations, as for example in the treatment of wounds and burns. A typical topical germicidal preparation comprises from 0.005 to 0.001% by weight of the antibiotic intimately blended with a mixture of 10.0 ml. of aluminum acetate solution, U.S.P.; 20.0 g. of anhydrous lanolin U.S.P.; and 30.0 g. of zinc oxide paste U.S.P. The compounds of the present invention can also be added to soaps and shampoos such as hexachlorophene liquid soap, U.S.P.

The present invention embraces all salts, including acid-addition and metal salts, of the newly recognized amphoteric antibiotics. The well known procedures for preparing salts of tetracycline compounds are applicable here and are illustrated by examples appearing hereinafter. Such salts may be formed with both pharmaceutically acceptable and pharmaceutically unacceptable acids and metals. By "pharmaceutically acceptable" is meant those salt-forming acids and metals which do not substantially increase the toxicity of the amphoteric antimicrobial agent. The preferred salts are the acid addition salts and pharmaceutically acceptable metal salts.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g., p-toluenesulfonic acids, and the like. The pharmaceutically unacceptable acid addition salts, while not useful for therapy, are valuable for isolation and purification of the newly recognized antibiotic. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g., the hydrochloride, by solution in hydrochloric acid and crystallization of the hydrochloride salt formed. The perchloric acid salts are useful for purification and crystallization of the new antibiotics.

Whereas many metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number of up to and including 20 i.e., metal chelates, which are well recognized in the tetracycline art. The pharmaceutically unacceptable metal salts embrace most commonly salts of lithium and of alkaline earth metals of atomic number greater than 20, i.e., barium and strontium, which are useful for isolation and purifying the antibiotic. Since the new antibiotic is amphoteric, it also forms salts with amines of sufficient basicity.

It will be obvious that, in addition to their value in therapy, the pharmaceutically acceptable acid and metal salts are also useful in isolation and purification.

The following examples are given to illustrate further the scope of the present invention, but are not to be construed as limitations thereof.

Example I

To 30 ml. of 75% formic acid under a nitrogen atmosphere is added 2.00 g. of 2-decarboxamido-6-deoxy-6-demethyltetracycline-2-nitrile. The mixture is stirred at room temperature and 2.0 g. of activated Raney nickel is added. The mixture is stirred for 45 minutes on a steam bath, during which time the temperature rises to about 50° C. The mixture is filtered through Super-Cel (Johns-Manville Co., New York, N.Y.) and the filtered material is washed with methanol. The filtrate, after the addition of 10 ml. of 6 N hydrochloric acid, is evaporated to give a greenish foamy residue. Toluene (15 ml.) is added and then evaporated under reduced pressure. The toluene addition and evaporation is repeated to insure complete removal of formic acid. The green foamy residue is dissolved in 70 ml. of n-butanol saturated with 1 N hydrochloric acid. The n-butanol is extracted with three 25/ml.-portions of 1 N hydrochloric acid which have been saturated with n-butanol. All the 1 N hydrochloric acid extracts are combined and extracted with three 20/ml.-portions of n-butanol saturated with 1 N hydrochloric acid. The butanol extracts are combined with the initial butanol layer and evaporated. The residue is then treated twice with toluene as described above to insure complete removal of the butanol. The residue, crude yellow, amorphous 6-deoxy-6-demethyltetracycline-2-imine, is converted into the p-toluenesulfonate addition salt by dissolving it in 15 ml. of methanol, adding 2.0 g. of p-toluenesulfonic acid, and warming the solution on a steam bath. Cooling the solution to room temperature and stirring overnight provides crystals of 2-decarboxamido-6-deoxy-6-demethyltetracycline-2-imine p-toluenesulfonate which are filtered and washed successively with methanol, acetone, and ether. The yield is 2.09 g. Substantially the same results are obtained when the reduction is carried out with acetic acid instead of formic acid.

*Analysis.*—Calc'd for $C_{28}H_{30}O_9N_2S$ (percent): C, 58.93; H, 5.29; N, 4.91; S, 5.61. Found (percent): C, 58.56; H, 5.59; N, 4.79; S, 5.55.

The analytical sample had $\lambda_{max}$ m$\mu$ ($\epsilon$) 264 (14,100), 302 (18,600) and 348 (16,400) in methanol—0.01 N HCl.

Example II

To 75 ml. of 75% formic acid at room temperature and under a nitrogen atmosphere is suspended 5 g. of 7-chloro-2-decarboxamidotetracycline-2-nitrile. To this suspension is added with stirring 2.5 g. of activated Raney-nickel catalyst. The resultant mixture is stirred on a water bath for a period of about 20 minutes, the temperature of the reaction mixture reaching about 50° C. At the end of this heating period, the solution of 7-chloro-2-decarboxamidotetracycline-2-nitrile is complete. The mixture is stirred at 50° C. for an additional 20 minutes, cooled to room temperature, and filtered through Super-Cel. The residue is washed with methanol and the filtrate is diluted with twice its volume of water. To the resultant solution is then added 10 g. of sulfosalicylic acid. After stirring overnight, the crystallized 7-chloro-2-decarboxamidotetracycline-2-imine sulfosalicylate is filtered and successively washed with 1:1 methanol-water, acetone and ether. The yield is 3.6 g.; $\lambda_{max}$ m$\mu$ ($\epsilon$) 256 (15,700), 300 (21,800), 340 (10,300), 371 (14,000) in methanol—0.01 N HCl.

*Analysis.*—Calc'd for $C_{29}H_{29}O_{13}N_2SCl \cdot 2H_2O$ (percent): C, 48.57; H, 4.64; N, 3.91; S, 4.48; Cl, 4.94; $H_2O$, 5.0. Found (percent): C, 48.77; H, 4.70; N, 3.86 S, 4.43; Cl, 5.06; $H_2O$, 6.4.

Example III

In 30 ml. of 75% formic acid at room temperature and under an atmosphere of nitrogen is suspended 2.0 g. of 2-decarboxamido-α-6-deoxy-5-hydroxytetracycline - 2 - nitrile. One g. of Raney-nickel catalyst is added to the suspension and the reaction mixture is heated on the water bath. When the temperature of the mixture reaches 40° C. the solution of the nitrile is complete. After an additional 10 minutes of heating the reaction temperature is about 50° C. The reaction mixture is stirred and heated an additional 5 minutes whereupon the temperature reaches about 58° C. Another gram of nickel catalyst is added and the mixture is stirred another 3 minutes. The reaction mixture is cooled to room temperature and filtered through Super-Cel. Hydrochloric acid (2 ml.) is added and the solution evaporated under reduced pressure. To the greenish foamy residue is added 30 ml. of toluene and the mixture is again evaporated. The toluene treatment is repeated to insure complete removal of formic acid.

The residue is dissolved in a mixture of 70 ml. of n-butanol which has been saturated with 1 N hydrochloric and 25 ml. of 1 N HCl saturated with n-butanol. After shaking the mixture the n-butanol layer is removed and extracted twice with a small amount of N hydrochloric acid saturated with n-butanol. The hydrochloric acid extracts are combined and extracted three times with n-butanol saturated with 1 N hydrochloric acid. The butanol extracts are combined and evaporated and the residue is treated twice with toluene as described above to remove all butanol. The residue, the desired 2-decarboxamido-α-6-deoxy-5-hydroxytetracycline-2-imine, a yellow amorphous solid, had $\lambda_{max}$ m$\mu$ ($\epsilon$) 263 (12,900), 300 (15,700), 350 (14,300) in methanol-0.01 N HCl.

Example IV

Using the procedures of Examples I to III, the 2-decarboxamidotetracycline-2-nitriles in Table II are reduced to the corresponding 2-decarboxamidotetracycline-2-imines.

TABLE II

| $R^1$ | $R^2$ | $R^3$ | $R^4$ |
|---|---|---|---|
| H | H | $CH_3$ | H |
| H | OH | $CH_3$ | Br |
| H | OH | H | Cl |
| H | OH | H | H |
| OH | OH | $CH_3$ | H |
| H | H | $CH_3$ | H |
| H | H | H | Cl |
| H | $CH_2=$ | | H |
| OH | $CH_2=$ | | H |
| H | $CH_2=$ | | Cl |
| OH | $CH_2=$ | | Cl |

Similarly, the following 2-imines are also prepared from the corresponding 2-nitriles according to the procedures of Examples I–III.

4-hydroxy-4-desdimethylaminotetracycline-2-imine
4-amino-4-desdimethylaminotetracycline-2-imine
5-hydroxy-5a,6-anhydrotetracycline-2-imine
4-amino-4-desdimethyl-5a,6-anhydrotetracycline-2-imine

Example V

To 100 ml. of 75% formic acid under a nitrogen atmosphere and at room temperature is added 10 g. of 2-decarboxamidotetracycline-2-nitrile. After stirring the mixture for about 5 minutes the solution of the nitrile is complete. To the resultant solution is then added 10.0 g. of activated nickel catalyst. The mixture is heated on a water bath for about 15 minutes, during which time the temperature reaches about 55° C. The mixture is then heated from 50–54° C. for an additional ½ hour, cooled in an ice bath, and filtered through Super-Cel. The residue is washed with a small amount of cold methanol and the filtrate is evaporated to a volume of about 30 ml. About 150 ml. of n-butanol saturated with N HCl is then added and the solution is extracted with three 50-ml. portions of N HCl saturated with n-butanol. The HCl extracts are combined and extracted with n-butanol saturated with N HCl. The n-butanol extracts are combined and evaporated to dryness and the yellow-orange crystals that are obtained are slurried in a small amount of toluene and the resultant mixture evaporated. Methanol is added to the residue and the mixture is kept overnight at room temperature. The 2-decarboxamidoanhydrotetracycline-2-imine is filtered and washed with methanol, followed by ether. The yield is 4.89 g., $\lambda_{max}$ m$\mu$ ($\epsilon$) 272 (43,000), 298 (20,500), 421 (8,400) in methanol-0.01 N HCl.

*Analysis.*—Calc'd for $C_{22}H_{23}O_6N_2Cl \cdot H_2O$ (percent): C, 56.83; H, 5.42; N, 6.02; Cl, 7.62; $H_2O$, 3.9. Found (percent): C, 57.11; H, 5.39; N, 6.01; Cl, 7.66; $H_2O$, 5.2.

When the above reaction is carried out at −10° to 0° C. significant amounts of the corresponding 2-decarboxamidotetracycline-2-imine is obtained.

Example VI

To 50 ml. of ethanol is added 0.5 g. of 7-chloro-2-decarboxamidotetracycline-2-imine. To the resultant solution is then added 0.212 ml. of triethylamine and 0.138 g. of 5% palladium on charcoal (50% water-wet). The mixture is shaken under hydrogen at 3 atmospheres pressure on a Parr hydrogenation apparatus (Parr Instrument Company, Moline, Illinois) for 45 minutes. The mixture is filtered through Super-Cel and the catalyst is washed with small amounts of methanol. The filtrate is evaporated cold and the residue, a yellow gum, is crystallized by trituration with methanol. The mixture is filtered and the yellow crystals washed with methanol, then ether. The yield is 0.070 g. of 2-decarboxamidotetracycline-2-imine free base, $\lambda_{max}$ m$\mu$ ($\epsilon$) 230 (11,600), 264 (8,700), 301 (12,800), 360 (9,300) in methanol-0.01 N HCl.

Example VII 20 mg. of 2-decarboxamidoanhydrotetracycline-2-imine is refluxed under nitrogen in 5 ml. of 1 N sulfuric acid for 3 hours. The reaction mixture is cooled and filtered to give 2-decarboxamido-anhydrotetracycline sulfate as an orange amorphous solid. The product is washed with water and dried; yield 6 mg., $\lambda_{max}$ m$\mu$ ($\epsilon$) 273 (42,500), 430 (9,200) in methanol-0.01 N HCl.

Except for 7 - chloro - 2 - decarboxamidotetracycline-2-imine, 7-bromo-2-decarboxamidotetracycline-2-imine, 6-demethyl - 2 - decarboxamidotetracycline - 2 - imine, 5-hydroxy-2-decarboxamidotetracycline - 2 - imine, and 5-hydroxy-5a,6-anhydro-2-decarboxamidotetracycline-2-imine, the 2-decarboxamidotetracycline-2-imines of Examples I–V give the corresponding 2-decarboxamidotetracyclines when reacted according to the above procedure.

7-chloro-2-decarboxamidotetracycline - 2 - imine, 7-bromo-2-decarboxamidotetracycline-2-imine, and 6-demethyl-2-decarboxamidotetracycline-2-imine give the corresponding 2 - decarboxamido - 5a,6 - anhydrotetracyclines when reacted according to the above procedure, while 5-hydroxy-2-decarboxamidotetracycline-2-imine and 5-hydroxy-5a, 6-anhydro-2-decarboxamidotetracycline-2-imine are degraded under the same conditions.

Example VIII 2.35 g. of 2-decarboxamido-6-deoxy-6-demethyltetracycline-2-imine p-toluenesulfonate is stirred in 94 ml. of 1% sodium hydroxide for about 1 hour under nitrogen at room temperature. The solution is acidified with dilute hydrochloric acid until the pH is 4.5–5.0. Crystalline material precipitates from the solution and the mixture is stirred at room temperature overnight under nitrogen. The yellow crystalline 2-decarboxamido-6-deoxy-6-demethyltetracycline-2-formyl is filtered and successively washed with water, acetone and ether. The yield is 1.01 g.

*Analysis.*—Calc'd for $C_{21}H_{21}O_7N \cdot H_2O$ (percent): C, 60.42; H, 5.55; N, 3.66. Found (percent): C, 59.9; H, 5.66; N, 3.45.

The analytical specimen had $\lambda_{max}$ m$\mu$ ($\epsilon$) 275 (18,200), 350 (16,300) in methanol-0.01 N HCl.

The filtrate is extracted twice with n-butanol. The butanol extracts are combined, washed twice with water and evaporated. The residue is treated twice with toluene as described in Example I to remove traces of butanol, then slurried in ether and filtered to give an additional 0.51 g. of crude 2-decarboxamido-6-deoxy-6-demethyltetracycline-2-formyl.

Similarly, with the exception of 5-hydroxy-5a,6-anhydro-2-decarboxamidotetracycline-2-imine, the 2-decarboxamido-2-formyl derivatives of the 2-decarboxamidotetracycline-2-imines listed in Examples II–IV and VI are prepared according to the above procedure.

Example IX 3.0 g. of anhydrotetracycline-2-imine is added to 120 ml. of a 1% sodium hydroxide solution which is at room temperature and under nitrogen. After about 5 minutes the solution is complete. The solution is stirred for an hour and 3 N hydrochloric acid is slowly added. After about 9 ml. of acid is added a heavy amorphous precipitate appears. When a total of 16.5 ml. of the 3 N HCl is added the pH of the reaction mixture is about 4.5. At this point the precipitate becomes partially crystalline. The addition of the hydrochloric acid is continued until a total of about 40 ml. is added. The mixture is stirred at room temperature overnight, filtered, and the filtered material washed with water until the washings are neutral to litmus. The 2-decarboxamidoanhydrotetracycline-2-formyl is then washed with acetone and ether; yield 2.45 g.

*Analysis.*—Calc'd for $C_{22}H_{22}O_7NCl$ (percent): C, 58.9; H, 4.93; N, 3.13. Found (percent): C, 58.78; H, 5.47; N, 3.16.

The analytical sample had $\lambda_{max}$ m$\mu$ ($\epsilon$) 272 (49,700), 423 (10,100) in methanol-0.01 N HCl.

Example X 20 mg. of 2 - decarboxamidoanhydrotetracycline - 2-formyl is refluxed under nitrogen in 5 ml. of 1 N sulfuric acid for 3 hours. The mixture is cooled, filtered, and the orange amorphous 2 - decarboamidoanhydrotetracycline sulfate is washed with water and air-dried. The yield is 11 mg., having an ultraviolet spectrum identical with that of the product of Example VII.

Except for 7-chloro - 2 - decarboamidotetracycline-2-formyl, 7 - bromo-2-decarboxamidotetracycline-2-formyl, 6-demethyl-2-decarboxamidotetracycline-2-formyl, and 5-hydroxy-2-decarboxamidotetracycline-2-formyl, the 2-decarboxamido-2-formyltetracyclines prepared in Example VIII are also hydrolyzed to the corresponding 2-decarboxamidotetracyclines according to the above procedure.

7-chloro - 2 - decarboxamidotetracycline-2-formyl, 7-bromo-2-decarboxamidotetracycline-2-formyl, and 6-demethyl - 2 - decarboxamidotetracycline-2-formyl give the corresponding 2-decarboxamido-5a,6-anhydrotetracyclines when hydrolyzed according to the above procedure, while 5-hydroxy - 2 - decarboxamidotetracycline-2-formyl is degraded under the same conditions.

Example XI 0.50 g. of 2-decarboxamido-6-deoxy-6-demethyltetracycline-2-formyl p-toluenesulfonate is added to 5 ml. of methanol. 3 ml. of 10% sodium hydroxide solution and 1.0 of hydroxylamine hydrochloride is added. After solution is complete, 5 ml. of water is added and the reaction mixture is warmed for about 15 minutes. Crystallization begins and an additional 3 ml. of 10% sodium hydroxide is added. At this point the pH is about 7.0. The mixture is stirred overnight at room temperature, then filtered, and the crystals successively washed with water, acetone, then ether. The yield is 160 mg. of 2-decarboxamido-6-deoxy-6-demethyltetracycline - 2 - nitrile, the infrared and ultraviolet spectra of which are identical with authentic material.

Example XII

To 100 ml. of methanol is added 0.500 g. of 2-decarboxamido-6-deoxy-6-demethyltetracycline-2-formyl p-toluenesulfonate. The mixture is stirred and warmed until solution is complete and then cooled to room temperature. To the resultant solution is then added 333 mg. of platinum dioxide under a carbon dioxide atmosphere. The mixture is shaken at room temperature under hydrogen at 2 atmospheres pressure on a Parr hydrogenation apparatus for 6 hours. The reaction mixture is filtered and the filtrate evaporated to give 2-decarboxamido-6-deoxy-6-demethyltetracycline-2-hydroxymethyl as an amorphous solid, $\lambda_{max}$ m$\mu$ ($\epsilon$) 272 (13,200), 345 (10,200) in methanol-0.01 N HCl.

The remaining 2-formyltetracyclines of Examples VIII and IX are similarly reduced to the 2-hydroxymethyl derivatives.

Example XIII

To 50 ml. of methanol is added 2.0 g. of 2-decarboxamido-6-deoxy-6-demethyltetracycline-2-imine hydrochloride. To the resultant solution is added 1.0 g. of platinum dioxide under a carbon dioxide atmosphere. The mixture is shaken at room temperature under hydrogen at 3 atmospheres on a Parr hydrogenation apparatus for about 6 hours. The reaction mixture is filtered through Super-Cel and the filtrate is evaporated to yield 1.8 g. of crude 2-decarboxamido-6-deoxy-6-demethyltetracycline-2-aminomethyl which is crystallized as the p-toluenesulfonate from a methanol-water mixture containing p-toluenesulfonic acid.

*Analysis.*—Calc'd for $C_{21}H_{24}O_6N_2 \cdot C_7H_8O_3S \cdot H_2O \cdot CH_3OH$ (percent): C, 56.0; H, 6.14; N, 4.50; S, 5.15; $H_2O$, 2.90. Found (percent): C, 55.88; H, 5.64; N, 4.36; S, 5.7; $H_2O$, 3.5.

The analytical sample had $\lambda_{max}$ m$\mu$ ($\epsilon$) 274 (14,100), 320 (15,000), 354 (17,000) in methanol-0.01 N HCl.

The 2-iminotetracyclines listed in Examples II–V are likewise reduced to the 2-aminoethyl derivatives according to this procedure.

Example XIV

The hydrochloride acid addition salts of the amphoteric tetracyclines described in the preceding examples are prepared by dissolving them in methanol containing an equimolar amount of hydrogen chloride. The hydrochloride salt is then precipitated by addition of ether, and is collected by filtration and dried. The hydrochloride may be recrystallized from butanol, butanol-hydrochloric acid, acetone, acetone-hydrochloric acid or methanol-hydrochloric acid.

In the same manner, the acid addition salts of the acids below are similarly prepared: sulfuric, nitric, perchloric, hydrobromic, phosphoric, hydrofluoric, p-toluenesulfonic, hydriodic, tartaric, acetic, citric, malic, benzoic, glycollic, gulonic, gluconic, succinic, sulfosalicyclic acids.

Example XV

The sodium salts of the tetracyclines described in the preceding examples are prepared by dissolving the amphoteric substance in water containing an equimolar amount of sodium hydroxide and freeze drying the resulting mixture.

In this fashion, the potassium and lithium salts are prepared.

The metal salt complexes of the present new tetracyclines are prepared by dissolving them in a lower aliphatic alcohol, preferably methanol, and treating with an equimolar amount of the selected metal salt, preferably dissolved in the selected alcohol. The complexes are isolated in some instances by simple filtration, but often, since many of them are alcohol soluble, by evaporation of the solvent or addition of a non-solvent such as diethyl ether.

In this fashion, metal salt complexes of the present new tetracyclines consisting primarily of compounds containing a 1:1 ratio of metal to tetracycline are prepared employing the following metal salts: calcium chloride, cobalt chloride, magnesium sulfate, magnesium chloride, stannous chloride, zinc chloride, cadmium chloride, barium chloride, silver nitrate, stannous nitrate, strontium nitrate, magnesium acetate, manganous acetate, palladium chloride, maganous chloride, cerium chloride, titanium chloride, platinum chloride, vanadium chloride, plumbous acetate, stannous bromide, zinc sulfate, chromous chloride and nickellous chloride.

What is claimed is:

1. A process for preparing a 2-decarboxamidotetracycline-2-imine from its corresponding 2-decarboxamidotetracycline-2-nitrile which comprises contacting said 2-decarboxamidotetracycline-2-nitrile with a nickel catalyst and an aqueous lower alkanoic acid solution at a temperature from about $-10°$ C. to 75° C. until the conversion is substantially complete.

2. A compound selected from the group having the formula:

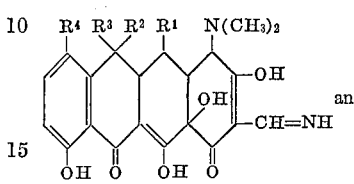
and
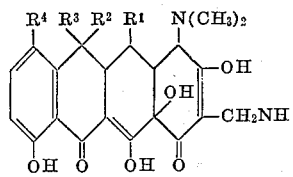

wherein:

$R^1$ is either H or OH;
$R^2$ is either H or OH;
$R^3$ is either H or $CH_3$, provided that $R^3$ is $CH_3$ when $R^1$ is OH; and $R^4$ is either H, Cl, or Br;
and the acid addition salts and pharmaceutically acceptable metal salts thereof.

3. A compound of claim 2 wherein $R^1$, $R^2$, $R^3$ and $R^4$ are each H.

4. A compound of claim 2 wherein $R^1$ is H, $R^2$ is OH, $R^3$ is $CH_3$, and $R^4$ is Cl.

5. A compound of claim 2 wherein $R^1$ is OH, $R^2$ is H, $R^3$ is $CH_3$ and $R^4$ is H.

6. A compound of claim 2 wherein $R^1$ is H, $R^2$ is OH, $R^3$ is $CH_3$ and $R^4$ is H.

7. A compound selected from the group having the formula:

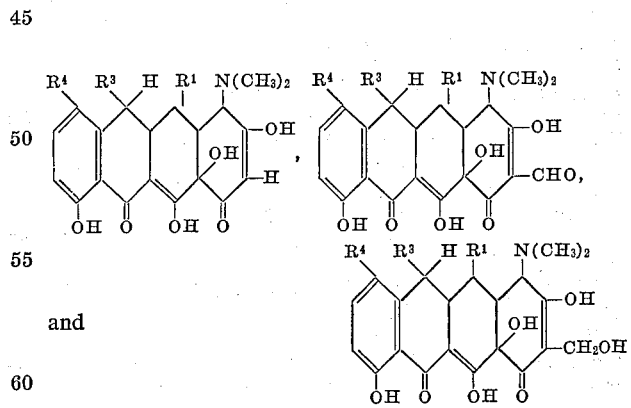

wherein:

$R^1$ is either H or OH;
$R^3$ is either H or $CH_3$, provided that $R^3$ is $CH_3$ when $R^1$ is OH; and
$R^4$ is either H, Cl, or Br;
and the acid addition salts and pharmaceutically acceptable metal salts thereof.

8. A compound of claim 7 wherein $R^1$, $R^3$, and $R^4$ are each H.

9. A compound selected from the group having the formula:

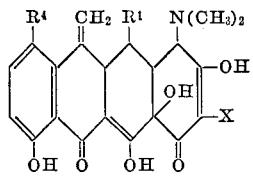

wherein:
R¹ is either H or OH;
R⁴ is either H, Cl, or Br; and
X is either H, CHO, or —CH=NH; and
the acid addition salts and pharmaceutically acceptable metal salts thereof.

10. A compound selected from the group having the formula:

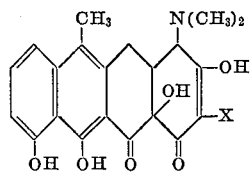

wherein X is either H, CHO, —CH=NH, —CH₂NH₂, or —CH₂OH; and the acid addition salts and pharmaceutically acceptable metal salts thereof.

11. The compound of claim 10 wherein X is

—CH=NH.

12. The compound of claim 10 wherein X is —CHO.

13. The compound of claim 10 wherein X is H.

References Cited

UNITED STATES PATENTS 3,022,347  2/1962  Tanner et al. ____ 260—559AT

NICHOLAS S. RIZZO, Primary Examiner

A. M. T. TIGHE, Assistant Examiner

U.S. Cl. X.R.

424—200, 227, 245; 260—429R, 429.2, 429.5, 429.7, 429.9, 430, 435R, 438.5R, 439R

UNITED STATES PATENT OFFICE
CERTIFICATE OF CORRECTION

Patent No. 3,584,044    Dated June 8, 1971

Inventor(s) James J. Korst

It is certified that error appears in the above-identified patent and that said Letters Patent are hereby corrected as shown below:

Col. 3, lines 5-12, that portion of the formula reading

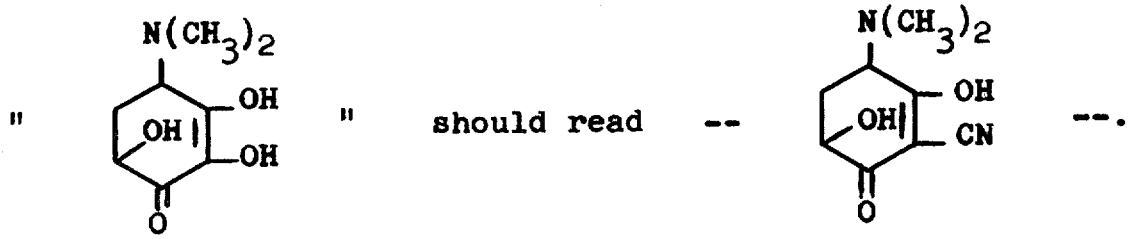

Col. 4, line 75, "et." should read -- etc. --.

Signed and sealed this 26th day of October 1971.

(SEAL)
Attest:

EDWARD M. FLETCHER, JR.
Attesting Officer

ROBERT GOTTSCHALK
Acting Commissioner of Patents